A. L. SIEGRIST.
VEHICLE TIRE.
APPLICATION FILED OCT. 10, 1910.
1,012,459.
Patented Dec. 19, 1911.
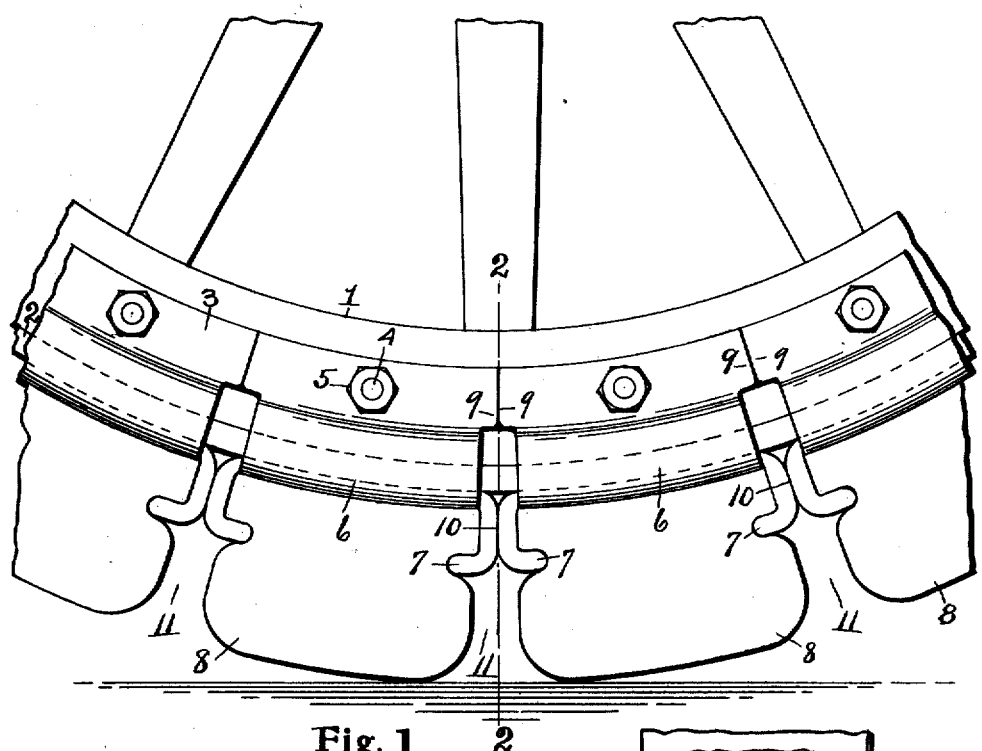
Fig. 1
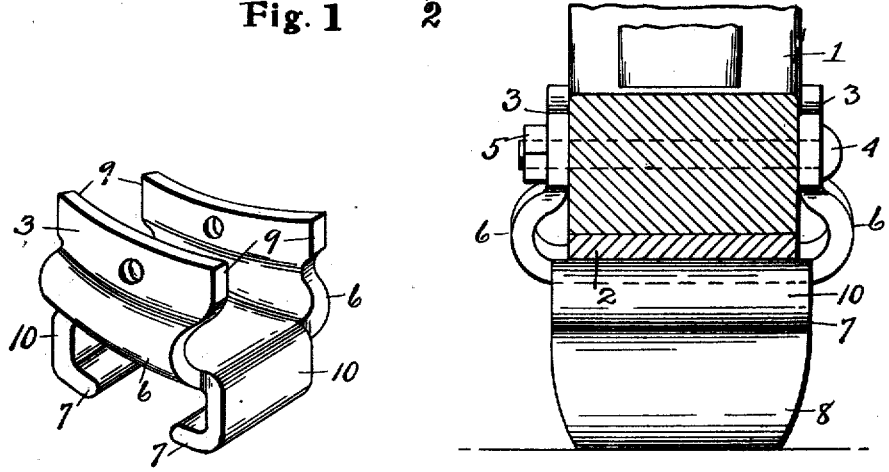
Fig. 3.
Fig. 2.
Witnesses
Q. B. Baenziger
S. L. Howlett
Inventor
Albert L. Siegrist
By
E. H. Wheeler Attorney
COLUMBIA PLANOGRAPH CO., WASHINGTON, D. C.

UNITED STATES PATENT OFFICE.

ALBERT L. SIEGRIST, OF AKRON, OHIO.

VEHICLE-TIRE.

1,012,459.  Specification of Letters Patent.  Patented Dec. 19, 1911.

Application filed October 10, 1910. Serial No. 586,161.

*To all whom it may concern:*

Be it known that I, ALBERT L. SIEGRIST, a citizen of the United States, residing at Akron, in the county of Summit, State of Ohio, have invented certain new and useful Improvements in Vehicle-Tires; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to block tires, especially designed for use on commercial motor vehicles, and consists in the construction and arrangement of parts hereinafter more fully set forth and pointed out particularly in the claim.

The object of the invention is to provide a tire of the character described of simple and inexpensive construction, wherein the arrangement is such as to obviate the heating and destructive effect of the wave motion incident to continuous-tread tires; to construct the block-carrying rim of separable sections independently removable; to facilitate repair by enabling the removal of a worn block only and to render the sections of the rim carrying the blocks coöperative in maintaining themselves firmly in place and in strengthening the rim of the wheel.

The above object is attained by the structure illustrated in the accompanying drawings, in which:—

Figure 1 is a fragmentary view in elevation showing a portion of a vehicle wheel provided with a tire in accordance with my invention. Fig. 2 is a transverse section as on line 2—2 of Fig. 1. Fig. 3 is a perspective view of one of the sections of the rim with the rubber block removed therefrom.

Referring to the characters of reference, 1 designates the felly of the wheel, which is preferably made of wood, and which is provided with a metal band 2. The rim of the wheel is composed of a plurality of sections 3 in the form of metallic yokes which embrace the band 2 and extend onto the sides of the felly, being secured in place by the transverse bolts 4 which receive on their threaded ends the nuts 5. The sides of said yokes or rim sections are caused to swell outwardly, as shown at 6, to protect the ends of the bolts 4 from being sheared off by running against the curb or other similar obstruction.

Formed integral with the rim sections 3 are the hook-shaped clencher members 7 between whose inwardly extending terminals the rubber blocks 8 which form the resilient tire of the wheel, are placed, said blocks being molded or vulcanized in said members of the rim sections to permanently unite the blocks thereto; the completed rim formed by the assembled parts, comprising a plurality of sections or units, each section consisting of a yoke adapted to be detachably secured to the felly and a rubber block forming a portion of the resilient tire.

The yokes 3 are in effect sectors of the rim and are so proportioned that the projecting shoulders 9 at the terminals of the side portions thereof, will abut when said sectors are secured in position upon the felly, as clearly shown in Fig. 1, thereby producing a continuous rim which embraces the felly and strengthens the wheel. As an additional support or brace for the detachable sections, the hook members 7 are provided with flat bearing faces 10 which project into radial alinement with the abutting shoulders 9 so that the outer faces of said members will bear against one another, whereby said rim sections when secured in position, as shown in Fig. 1, are locked or braced against circumferential movement, rendering the outer segmental rim formed by said sections rigid throughout the entire circumference of the wheel and enabling them to be securely retained in place by a single bolt 4.

It will be noted that the blocks of rubber 8 are of such shape and are so disposed as to form open spaces 11 between them. This arrangement affords freedom of movement to each block under compression, producing in effect a softer and more resilient tire, and affording a structure wherein each section of the tire works independently for a short period of time and remains idle during the further rotation of the wheel until it again comes into play. By dividing the tire into blocks or sections, as shown, wave motion in the tire is obviated and the kneading action which results in heating in a continuous tire, is largely overcome.

A tire constructed as herein shown, may be readily repaired in case of injury by simply removing the section of the rim in which the injured block is set and substituting a new section therefor. This operation of repairing the tire necessitates the removal of but one bolt and does not require the removal of any portion of the tire excepting the section actually injured, enabling a repair to be made in a comparatively short time.

Having thus fully set forth my invention, what I claim as new and desire to secure by Letters Patent, is:—

A vehicle wheel tire comprising a rim formed of a plurality of sections, each section consisting of a member having inwardly extending side flanges adapted to embrace the felly and outwardly extending hook portions projecting in a direction opposite to said flanges, means for securing each section to the felly and a block of resilient material permanently secured between said hook portions.

In testimony whereof, I sign this specification in the presence of two witnesses.

ALBERT L. SIEGRIST.

Witnesses:
E. S. WHEELER,
I. G. HOWLETT.

Copies of this patent may be obtained for five cents each, by addressing the "Commissioner of Patents, Washington, D. C."